March 15, 1960 R. S. FORD 2,928,377
HAND AND POWER OPERATED MARINE AND AIRCRAFT STEERING GEAR
Filed April 11, 1955 3 Sheets-Sheet 1

INVENTOR.
Robert Sedgwick Ford

March 15, 1960  R. S. FORD  2,928,377
HAND AND POWER OPERATED MARINE AND AIRCRAFT STEERING GEAR
Filed April 11, 1955  3 Sheets-Sheet 2
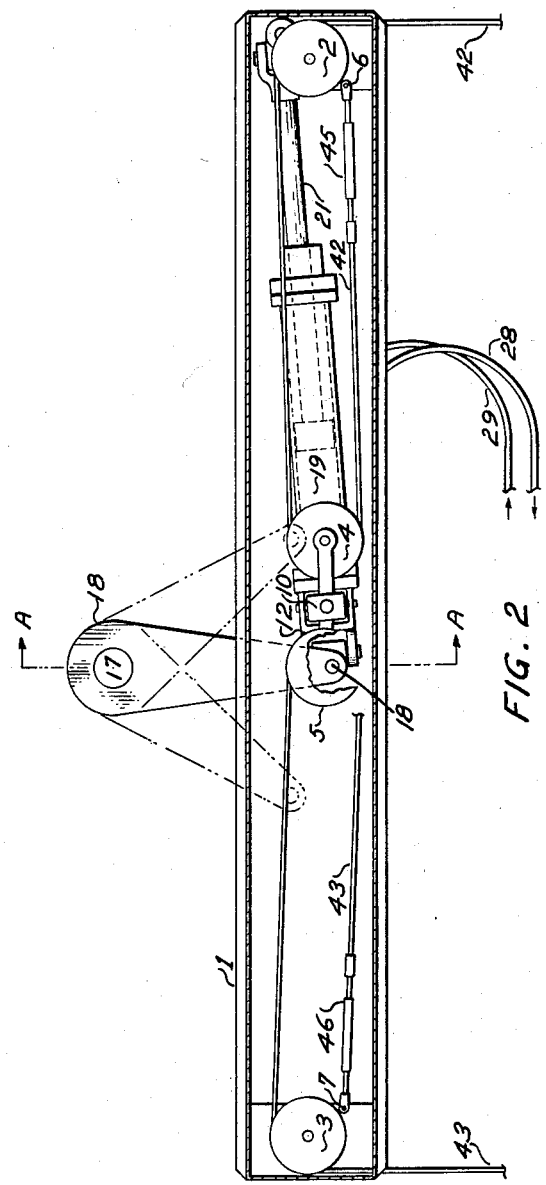
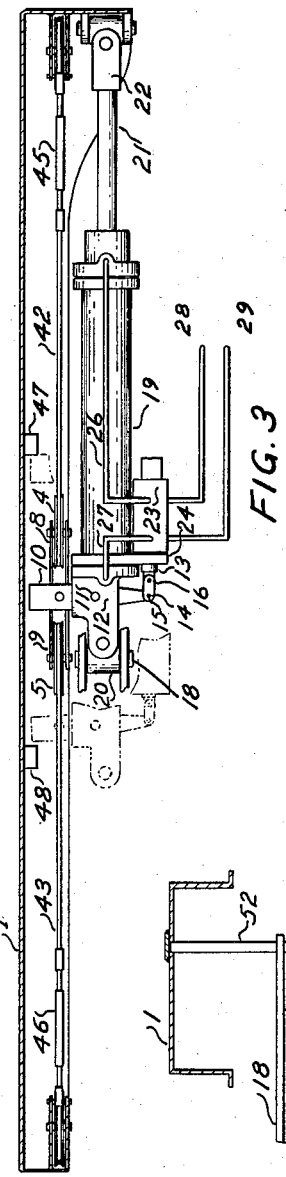
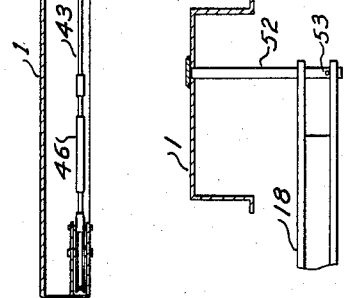
INVENTOR.
Robert Sedgwick Ford March 15, 1960 R. S. FORD 2,928,377
HAND AND POWER OPERATED MARINE AND AIRCRAFT STEERING GEAR
Filed April 11, 1955 3 Sheets-Sheet 3

INVENTOR.
Robert Sedgwick Ford

United States Patent Office 2,928,377
Patented Mar. 15, 1960

2,928,377

HAND AND POWER OPERATED MARINE AND AIRCRAFT STEERING GEAR

Robert Sedgwick Ford, Pascagoula, Miss.

Application April 11, 1955, Serial No. 500,381

4 Claims. (Cl. 121—41)

My invention relates to steering gear for marine and aircraft use. The broad object is to provide a complete power steering apparatus of the utmost efficiency yet simple and economical to manufacture, install, and maintain. This steering gear is intended to fill a long felt need in the smaller vessels where the more complicated steering equipment previously available has been found too expensive and difficult to maintain. A further object is to provide automatic shift from power to hand steering in the event of power failure, and to make the hand steering powerful and efficient enough to control the craft reliably. In addition to practical operating efficiency surpassing any steering gear previously available, this apparatus is remarkable for its extreme simplicity, which is in itself a considerable virtue and was the goal of a great deal of research.

In the drawings:

Fig. 2 is a plan view of the steering engine assembly, with the top plate of the foundation and parts of the pulley support plates cut away to show the working parts.

Fig. 3 is an elevation of the steering engine assembly looking aft, with the forward portion of the foundation cut away to show the working parts.

Fig. 4 is a section through the foundation taken along line A—A in Fig. 2.

Figure 5:
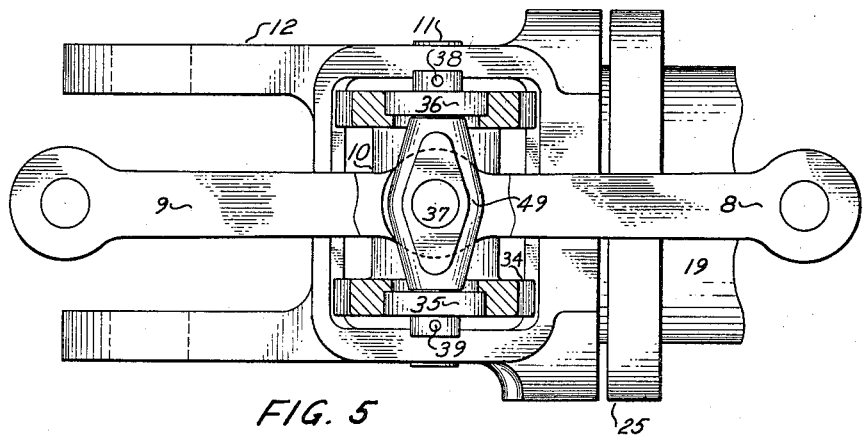
Figure 6:
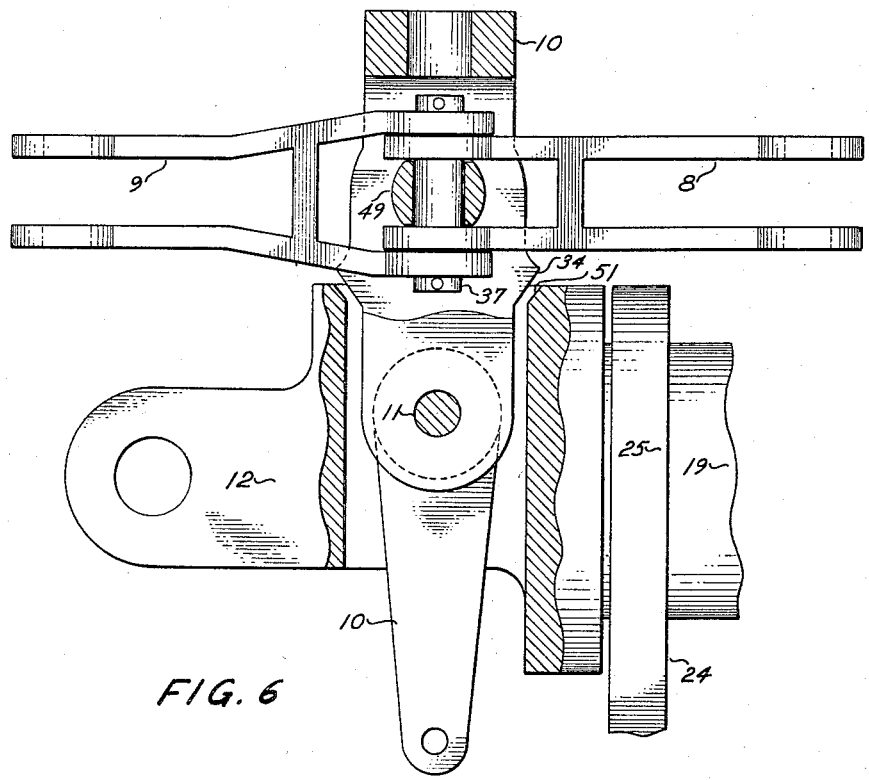

Figs. 5 and 6 respectively are plan and elevation views showing the control lever, universal joint, and tackle connection detail. In Fig. 5 the upper part of the lever is cut away to show the trunnion bearings, and in Fig. 6 the side of the head and the side of the lever are cut away.

Figure 1:
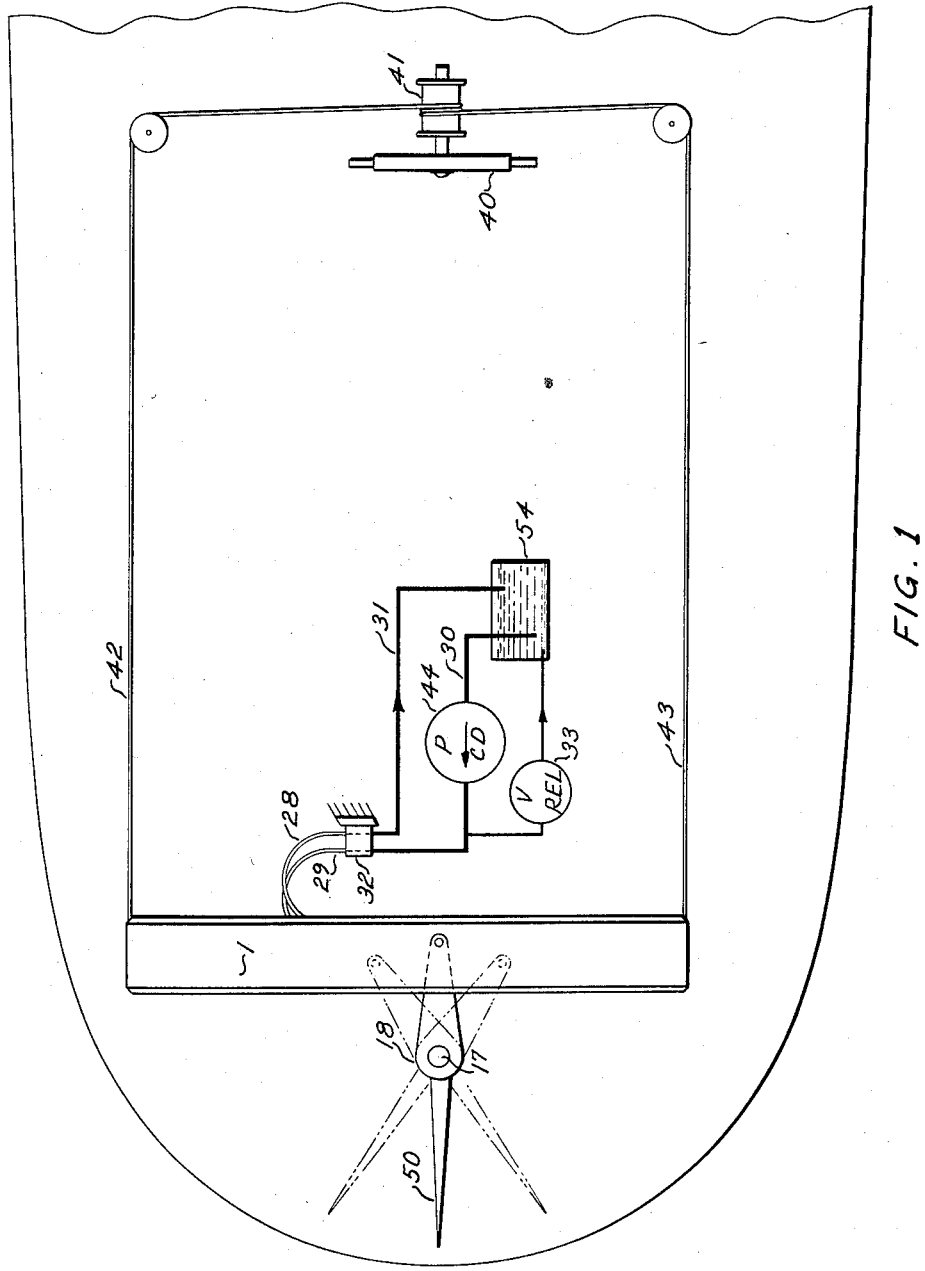
Fig. 1 is a plan view of the after part of a small vessel, showing the general arrangement of the steering apparatus.

Referring to Figs. 1, 2, and 3, it may be noted that the system basically consists of a novel steering engine controlled by wire rope tackle from a conventional drum steerer and powered by a double acting hydraulic cylinder which is supplied with hydraulic fluid by a power operated constant displacement pumping system.

In power steering the first small motion of the wheel 40 is transmitted through the wire rope tackle to actuate a hydraulic valve to initiate powered response from the cylinder, which continues to move the rudder as long as the operator keeps turning the wheel in the same direction, and stops when steering wheel motion stops. This powered response follows steering wheel movement in either direction and at any rate of wheel motion. To provide hand steering with power off the wire rope tackle is engaged with the working parts rigidly after the above mentioned first small motion required to actuate the valve, so as to make manual effort on the steering wheel directly effective to actuate the rudders, thus affording instantaneous automatic transfer to hand steering in case of power failure. The action obtained with power "on" is power steering with full "follow up" and fingertip effort. With power "off," reliable hand steering is obtained.

Referring to Figs. 2 and 3 for a more detailed description of the steering engine, it may be noted that the working parts are mounted in and partially enclosed by a long and narrow inverted channel shaped foundation 1, which serves the dual purpose of a machine frame and drip protection shield. The fairlead pulleys 2 and 3 are mounted in the ends of the foundation 1, carrying the wire cables 42 and 43 into alignment with the moving pulleys 4 and 5, which in turn carry the cables into alignment with the anchor pins 6 and 7 where the cables are dead ended with turnbuckles 45 and 46 for tension adjustment, thus forming a double purchase tackle. If desired this tackle arrangement may be further compounded for better hand steering on larger vessels by adding more pulleys superimposed on those shown and reeving on more parts of cable as required. The moving pulleys 4 and 5 are mounted in brackets 8 and 9 respectively, which in turn are pivotally connected to the lever 10 by a novel universal joint (detailed in Figs. 5 and 6 and described in detail below). The centerlines of pulleys 2, 3, 4, and 5 and the centerline of the said universal joint all lie in approximately the same horizontal plane. Pulleys 2 and 3 are located so that a line drawn from center to center of these pulleys intersects the arc described by the travel of the universal joint centerpoint along a chord having a height of slightly more than half the height of the maximum chord of the said arc. This is the space location of pulleys which affords the least change in cable tension due to the swing of the tiller through its travel, and has in practice proven to show no noticeable change in cable tension. In case a single purchase cable rigging is used, it would be necessary to shift pulleys 2 and 3 forward a distance equal to the pitch radius of the pulley, bringing the line of effective cable tension into coincidence with the geometric pattern described above. The above rule for location of the pulleys in general terms holding true for either single or multiple purchase rigging would read as follows: Pulleys 2 and 3 are located so that the centerlines of force in the two opposing branches of cable rigging contact the pulleys at points such that a line drawn between them intersects the arc described by the travel of the servomotor control input leaving an arc height slightly less than half the total height of the arc described by said control input. The lever 10 is supported by a pivot pin 11 within an opening in the head 12 of the hydraulic cylinder, and the lower end of the lever is secured to the valve stem 13 by link 14 and pins 15 and 16. The lever 10 is the means by which the cable motion in response to wheel movement is caused to actuate the valve 23 controlling the hydraulic cylinder 19.

The rudder 50 is mounted on the rudder stock 17, to which is secured the tiller 18, which in turn supports the head 12 of the double acting hydraulic cylinder 19 by means of a knuckle joint 20 and tiller pin 60 engaged in the tiller socket which allows the necessary pivoting in the horizontal plane when the tiller swings and also allows self aligning action in the vertical plane without allowing the cylinder to roll on its longer axis. The piston rod 21 is secured to the foundation 1 by a knuckle joint 22 similar to 20. It is thus seen that the piston rod is stationary except for a slight swinging action, and the head end of the cylinder pushes the tiller back and forth, the cylinder barrel moving in unison with the tiller. The control valve 23 is bolted to a support plate 24 extended from the locking ring 25, and is connected by hydraulic tubing lines 26 and 27 to the cylinder and by flexible hoses 28 and 29 to the stationary pipe lines 30 and 31 anchored in block 32. Pipe line 30 conveys hydraulic fluid from the constant displacement pump 44 to the valve, and pipe line 31 is the fluid return to the sump tank 54. The control valve 23 is a commercial standard four way spring centered hydraulic control valve of the sliding piston type provided with throttle type porting. This valve is so connected to the cylinder as to obtain hydraulically powered cylinder action as follows: Valve stem at neutral—cylinder locked; valve stem extended—cylinder retracts; valve stem retracted—cylinder extends. A relief valve 33 protects the system from overload. This standard combination control valve and cylinder is usually called a hydraulic servomotor and is so well known in the prior art of industrial hydraulics as to require no detailed description here.

Referring to Figs. 5 and 6 for a detailed description of the valve control parts, it may be noted that the valve control lever 10 is provided with four lugs as at 34, which are fitted to strike abutments as at 51 formed by the rim of the opening through cylinder head 12 when the lever is tilted to either extreme position. This is the feature which permits the full force of the wire rope tackle system to be made effective for hand steering, the stress being carried from tackle to lever to cylinder head to tiller in that order. The lever stroke is so proportioned as to be slightly less than the maximum possible valve stroke, to avoid hand steering loads being imposed on the valve stem. It may be noted that the lever 10 is so proportioned as to provide a longer lever arm below the pivot pin 11 than above it. A small cable motion is thus amplified by leverage action to a larger motion at the valve stem, thus improving steering sensitivity by decreasing the "lost motion" of the steering wheel required to actuate the valve. This feature is of importance in meeting the rigid naval specification for a discernible rudder response resulting from a small steering wheel movement equivalent to ¼ degree of rudder travel. By increasing the ratio of these leverage lengths in the manner shown it is possible to obtain practically any conceivable degree of sensitivity, subject to the eventual limitation in sensitivity marked by the appearance of the unstable jerky action known as "hunting" or "dither."

Referring again to Figs. 5 and 6 for a description of the double pivot joint, the upper portion of the lever 10 is provided with an opening, within which the trunnion 49 is mounted on ball bearings 35 and 36 carried in seatings bored in opposite walls of the opening in lever 10 and retained by pins in holes 38 and 39. The inner extremities of the pulley brackets 8 and 9 are in the form of bifurcated yokes, bracket 8 being fitted to engage the flats on trunnion 49 and bracket 9 being fitted to embrace the yoke jaws of bracket 8, with pin 37 passing through both the yokes and the trunnion securing the two yokes to each other and to the trunnion. The novel universal joint thus formed with the trunnion and its bearings is of key importance in the apparatus as it must in small space transmit heavy forces from both pulley brackets 8 and 9 to the lever 10 for hand steering, allow the lever 10 to tilt freely to transmit control motion to the valve 23 for power steering and allow the brackets 8 and 9 to swing in the horizontal plane for cable fairlead action without permitting them to tilt sidewise which would twist and foul the cables.

Referring to Fig. 3, stop lugs 47 and 48 are attached to the underside of the foundation to be struck by the upper end of the lever at the extreme limits of its travel and thus to limit the working travel of the entire apparatus. When the lever strikes one of the stop lugs, the lever is tilted back to the neutral or "power off" position, thus stopping the power stroke smoothly. As a refinement, set screws may be added in these lugs to permit adjusting the effective stroke.

While it would apparently be possible to install the apparatus without the foundation 1 by mounting the pulley supports, rod anchorage and stops separately in the structure of the vessel, it would not be practical to do so because the parts must all be located accurately in the proper space location with one another to function properly, and it would be impractically difficult to obtain the necessary accuracy in installing these parts piecemeal. With the various parts factory assembled into the foundation it is only necessary to locate the foundation properly in relation to the tiller. This is done readily and accurately by means of the locating fixture shown in Fig. 4, which comprises a shaft 52, proportioned to fit closely in the tiller pin hole, and provided with a hole for a pin 53 which is drilled at the precise distance from the end of the shaft required to gauge the elevation of the foundation above the lower jaw of the tiller. The upper end of this shaft 52 fits into an accurately located hole in the foundation which is capped with a welded plate to rest on top of the fixture shaft 52. When the foundation is being installed the shaft 52 is slipped through the tiller jaws from below and locked with pin 53 resting on top of the lower jaw of the tiller. The foundation is set with the upper end of the shaft 52 seated in the gage hole and thus accurately located ready for securing to the hull. After securing, the pin 53 is pulled out, and the shaft is withdrawn, leaving the foundation permanently located in the correct position.

In operation, the steering wheel 40 is manipulated in the conventional manner, the motion is transmitted by the drum steerer 41 to the cables 42 and 43, causing the cable system to pull on the upper end of the lever 10 and tilt it, thus operating the valve 23 and channeling hydraulic power to the cylinder 19 to obtain answering motions of the tiller. The cylinder follows the motion of the cable, and when the cable stops, the cylinder catches up with it, recenters the valve and stops likewise. In hand steering with "power off," the first slight motion of the steering wheel in either direction positions the valve for motion in that direction and thus releases the hydraulically locked condition existing when the valve is in neutral position, permitting the cylinder to be moved along with the tiller by manual effort. To keep the cylinder full of oil during hand steering, a check valve may be provided in the block 32 allowing oil displaced from one end of the cylinder to return back into the supply side of the control valve 23 and replenish the opposite end of the cylinder.

I claim as my invention:

1. In a hydraulic servomotor adapted for remote control by cable rigging, a control apparatus comprising a lever mounted substantially at right angles to the long axis of the servomotor in an opening running transversely through the head thereof, a pivot bearing supporting the lever in the said opening, means connecting one extremity of the lever to the valve stem, a trunnion with flattened sides carried in bearings seated in the two sides of an opening in the opposite end of the lever, a rigging bracket with yoke connection embracing the trunnion in contact with its flatted sides, another rigging bracket with yoke connection embracing both the trunnion and the jaws of the other bracket, and a pin passing through both the yokes and the trunnion, whereby the pulley brackets are secured to the lever and to one another in a manner whereby the lever may be free to tilt in a longitudinal plane and operate the valve stem and the rigging brackets are free to swing transversely yet are not allowed to rotate, all arranged and adapted to permit attachment of remote control cable rigging to the rigging brackets for the purpose of controlling the action of servomotor by means of the lever and valve.

2. An apparatus as in claim 1 including an extension on the end of the lever beyond the trunnion opening adapted to strike travel stops.

3. An apparatus as in claim 1 including lugs on the lever adapted to strike the rim of the said opening in the cylinder head, whereby the tilting motion of the lever may be limited and actuating force directly applied to the servomotor for manual steering.

4. An apparatus as in claim 1 where the lever arm from the lever pivot to the means connecting the lever to the valve stem is longer than the lever arm from the pivot to the trunnion, whereby greater control sensitivity is obtained.

References Cited in the file of this patent

UNITED STATES PATENTS

| Number | Name | Date |
|---|---|---|
| 136,493 | Dungan | Mar. 4, 1873 |
| 230,079 | Stevens | July 13, 1880 |
| 355,682 | Cowles | Jan. 11, 1887 |
| 426,538 | Lang | Apr. 29, 1890 |
| 526,930 | Maxon | Oct. 2, 1894 |
| 610,680 | Johnston | Sept. 13, 1898 |
| 858,207 | Patten | June 25, 1907 |
| 1,209,335 | Richardson | Dec. 19, 1916 |
| 2,366,382 | Burton | Jan. 2, 1945 |
| 2,566,273 | Westbury | Aug. 28, 1951 |
| 2,623,502 | Lisle | Dec. 30, 1952 |